July 19, 1927.
A. E. L. VON BOECKLIN ET AL
1,636,400
MOLDER OR STICKER DEVICE
Filed June 2, 1925
2 Sheets-Sheet 1
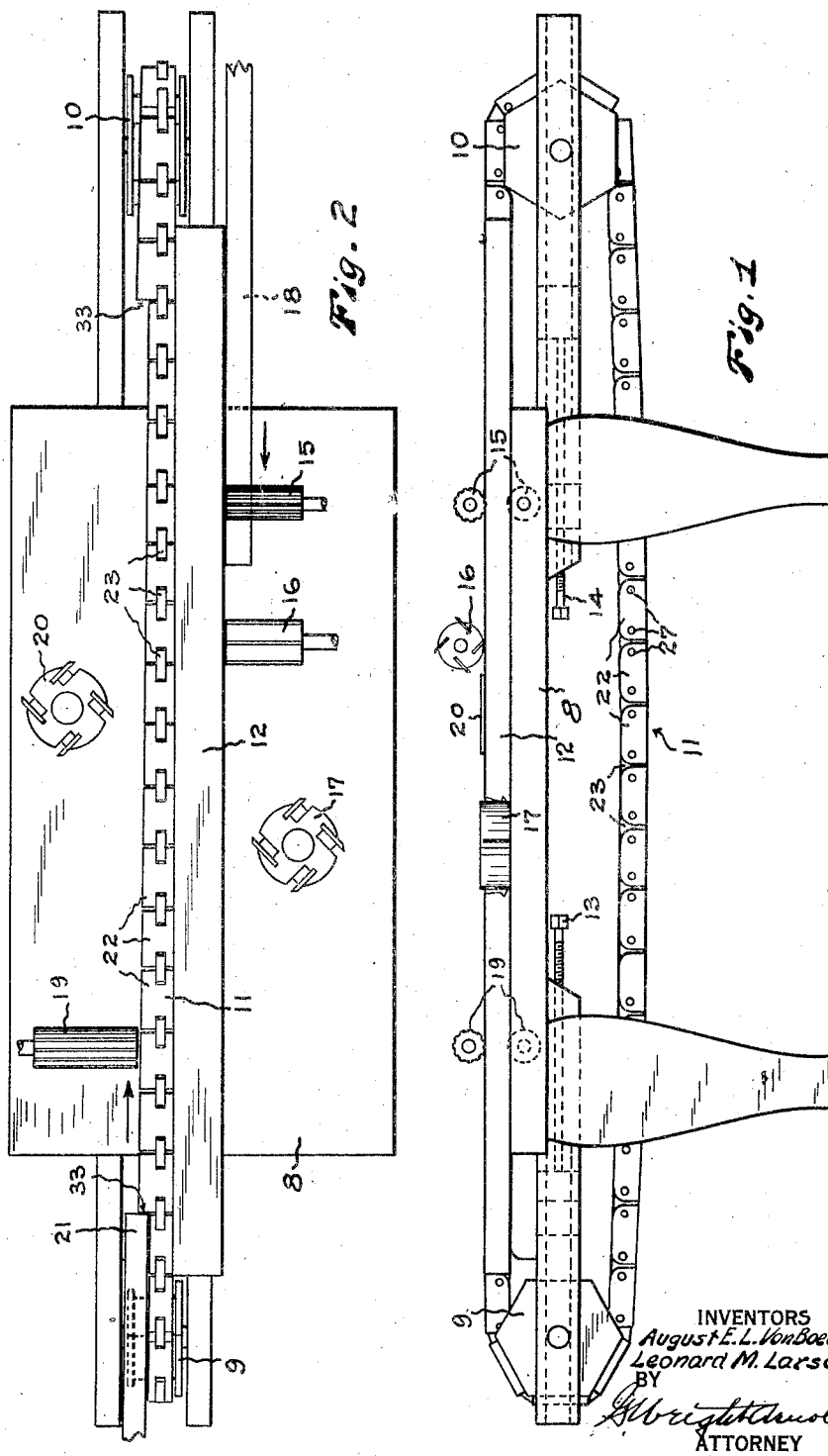
INVENTORS
August E. L. Von Boecklin
Leonard M. Larson
BY
ATTORNEY July 19, 1927. 1,636,400
A. E. L. VON BOECKLIN ET AL
MOLDER OR STICKER DEVICE
Filed June 2, 1925    2 Sheets-Sheet 2

INVENTOR
August E. L. Von Boecklin
Leonard M. Larson
BY
ATTORNEY

Patented July 19, 1927.

1,636,400

UNITED STATES PATENT OFFICE.

AUGUST E. L. VON BOECKLIN AND LEONARD M. LARSON, OF TACOMA, WASHINGTON, ASSIGNORS TO WASHINGTON MANUFACTURING CO., OF TACOMA, WASHINGTON, A CORPORATION OF WASHINGTON.

MOLDER OR STICKER DEVICE.

Application filed June 2, 1925. Serial No. 34,348.

Our invention relates to a molder or sticker device. More particularly, our invention relates to the art of devices for the manufacture of tapered wood or mill work.

Our invention will be described for purposes of clearness and illustration as applied to the preparation of staves for the manufacture of built up columns, but its scope is not to be considered as limited to any such specific application, but is to be considered as applicable to all cases where similar conditions and problems obtain.

Heretofore, the more usual practice has been for the operator to feed as a separate piece to the machine a tapered pattern against which at the same time was pressed the piece of lumber out of which the stave is to be formed. This tapered pattern has therefore had to be handled as a separate item, both in feeding and removing the material. A primary purpose of our invention is to provide a molder or sticker device which will render unnecessary the separate, or any, introduction of a tapered pattern with each piece of lumber out of which the stave is to be formed, the operator having no pattern piece to manipulate whatever.

In manufacturing columns out of separate parts, it is positively essential for manifest reasons of circular form to have said parts uniformly of the same width with a degree of nicety far more refined than obtains ordinarily in wood working art. A primary object of our invention is to provide a device which will guard against wear of the pattern, and permit of the said necessary exactness of manufacture of the parts. Since there are relatively a great number of parts in a single column thus fabricated, it is necessary by way of economy of manufacture that the cutting and forming of said elements be made at great speed, as well as with a high degree of accuracy as to proportions. A primary purpose of our invention is to provide a molder or sticker device which will increase the capacity a plurality of times over the present mode of manufacture.

In the manufacture of columns, in a general way, there are certain stock sizes. For example, stock sizes range in diameter from six inches to twelve inches, and for these stock sizes there is established a standardized swell which each manufacturer adopts. There may be some slight variations in the amount of the swell, but they are approximately the same. For the manufacture of these different stock sizes, a separate pattern is necessary for each different size, as the taper changes for each size. Obviously, as the diameter increases, the amount of bevel that is necessary for each stave becomes less. Since a fundamental rule in architecture is that the straight portion of the entasis of a column must vary with its length, it is manifest that a still further varying factor must be taken into account in manufacturing different lengths of columns of a given diameter, and while there are established the several stock sizes, not infrequently orders are received for columns of much greater diameter and much greater length to meet special specifications of the architect. Therefore, the variations and adjustments necessary in the molder and sticker device are of large number, and a primary object of our invention is to provide a pattern which does not have to be introduced with each stave forming piece, and will be adjustable to provide staves of the proper proportions to satisfy all of said varying conditions.

The above mentioned general objects of our invention, together with others inherent in the same, are attained by the device illustrated in the following drawings, the same being merely a preferred exemplary form of embodiment of our invention, throughout which drawings like reference numerals indicate like parts:

Figure 1 represents a view in side elevation of a molder or sticker device embodying our invention;

Fig. 2 is a plan view of the same;

Figure 3:
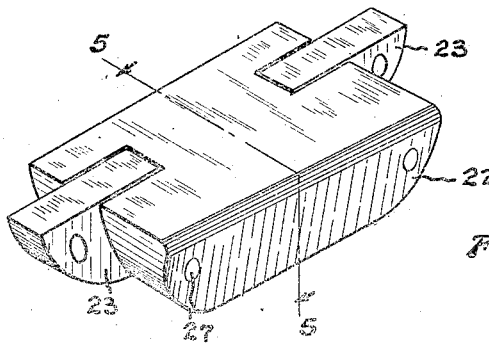
Fig. 3 is an enlarged view in perspective of one member of the chain link with connecting members mounted on one end.
Figure 4:
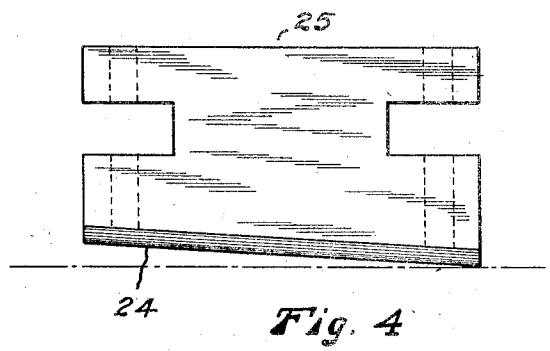
Fig. 4 is an enlarged plan view of one of the link elements.
Figure 5:
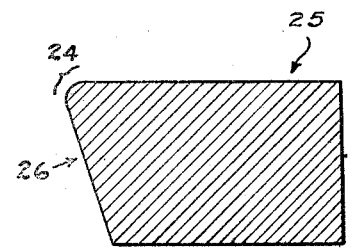
Fig. 5 is a view in cross section on dotted line 5, 5 of Fig. 3.

A table 8 is provided with pulleys 9 and 10, upon which pulleys an endless pattern chain 11 is mounted, the said pulleys being disposed to carry said chain straight across the surface of said table. The table 8 is divided into a front and rear side by means of a guide member 12. Adjustable means 13 and 14 provide for the proper adjustment of the space obtaining between pulleys 9 and 10.

On the table on the front side, there are provided feed rolls 15, top head 16 and a side head 17, the stave blank 18 being engaged successively by these different members in the order named. On the rear side of the table, feed rolls 19 and side head cutter 20 are provided, and the stave 21 engages these members in the order named.

The endless chain 11 is composed of links 22 having connecting members 23 therebetween. These links have one tapering edge 24 and this tapering edge is disposed on the rear side of the table. The straight side 25, therefore, abuts against the guide member 12. The side of the link having the tapering edge 24 also has the bevelled edge 26. These links thus constructed are connected together by means of the connecting members 23 and pins 27.

Figure 6:
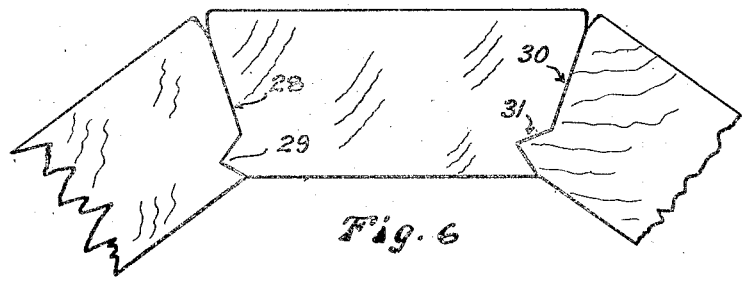
Fig. 6 is a view in end elevation of a stave.

The stave to be provided in the manufacture of columns has a form, cross-sectionally considered, such as is illustrated in Fig. 6, i. e., it has a bevelled side 28 with a tongue 29 and a bevel 30 with a groove 31.

Figure 7:
Fig. 7 is a plan view of a stave.

In plan view, (see Fig. 7), as at present manufactured the stave has a taper disposed on one side 32.

The mode of operation of a device embodying our invention is as follows: A stave blank 18 is fed by an operator to the feed rolls 15, and by the feed rolls to the top head 16, which cuts the blank to the proper depth, so that the stave is of the necessary thickness. Thereupon, the side head 17 cuts the bevel 28 and tongue 29 as shown in Fig. 6. An operator at the other end of the table 8 feeds the said blank 18 to the feed rolls 19, said blank on the rear side of the table being numbered 21 for purposes of distinction. The end of the blank is pressed against the offsets 33 in the pattern chain 11, the said offsets marking the end for a given stave as respects the endless pattern chain. It will be understood that the stave blank 18 is not turned end for end by the second operator when the said blank is pressed against the offsets 33, i. e., the trailing end of the stave blank 18 as it passes through the devices 15 and 16 and 17 becomes the leading end when its direction is reversed on the opposite side of the table. Thus is clearly avoided the act of reversing the ends as is necessary at the present time when a separate pattern is used. It will be noted that the feed rolls 19 press only upon the stave blank 21 and force forward the blank and at the same time the pattern chain, so that the stock or stave 21 is the means through which the pattern chain 11 is revolved, and thus all severe strain on the links of the pattern chain and wear is thereby reduced to a minimum. The side head cutter 20 cuts the bevelled edge 30, and at the same time supplies the tapering edge 32 and also the groove 31. These cutting heads may be of any suitable type, including stationary cutting knives. It is a known fact that stationary cutting knives, as opposed to revolving knives, do much smoother work when working with the grain of the wood.

It is manifest that in providing a two-way table, i. e., a table where the stave blanks may pass down one side and back on the other, avoids a great deal of manual labor and lost time in reversing the stave blanks, plus extra machinery, as is the present practice. The guide member 12 operates both as a guide for the stave when the first cutting is done, and it also operates as a backing or support for the endless pattern chain, performing these functions ordinarily simultaneously.

The amount of space involved in the plant is greatly economized, and this in turn effects great efficiency in manufacture, as the material does not have to be moved such great distances as has heretofore been the practice. In short, the economies produced by the invention herein set forth provide for a plurality of times increase in the production of the plant.

It is manifest that the links 22 may be numbered for purposes of identification and when it is desired to provide columns of different lengths, additional links of the required proportions may be quickly inserted in the chain, and the pattern thus adapted to make the different stock sizes, or it may be quickly adapted to make any special size desired.

Obviously, changes may be made in the form, dimensions and arrangement of the parts of our invention, without departing from the principle thereof, the above setting forth only a preferred form of embodiment.

We claim:—

1. A device of the character described embodying a table; an endless pattern chain operatively mounted on said table; material feeding means independent of said chain and material cutting means, both of said means being operatively disposed with respect to said chain.

2. A stave sticker device embodying a table; an endless taper pattern chain rotatably mounted on said table and disposed to be actuated by the material being operated upon; material feeding means; and material cutting means, both of said means being operatively disposed with respect to said chain.

3. In combination with a device of the character described, an endless taper pattern chain rotatably mounted, being disposed to be actuated by the material, whereby said chain is prevented from unduly wearing and the period of its accurate operation is prolonged.

4. A stave sticker device embodying a table; material feeding means; material cutting means, both of said means being operatively disposed on one side of said table; a guide means longitudinally axially positioned on said table, being operatively disposed with respect to said cutting means; an endless taper pattern chain operatively disposed with respect to said guide on the other side of the table; a second material feeding means; and a second material cutting means, both of said last named means being operatively disposed with respect to said chain.

5. A stave sticker device embodying a table; a material feeding means; material cutting means, both of said means being operatively disposed on one side of said table; a guide means longitudinally axially positioned on said table, being operatively disposed with respect to said cutting means; an endless taper pattern chain, said chain being rotatably mounted and free to travel along said table, being actuated in such traveling by the material being operated upon; a second material feeding means; and a second material cutting means, both of said last named means being operatively disposed with respect to said chain.

In witness whereof, we hereunto subscribe our names this 15th day of May, 1925.

AUGUST E. L. von BOECKLIN.
LEONARD M. LARSON.